(12) United States Patent
Talwar et al.

(10) Patent No.: US 11,804,082 B2
(45) Date of Patent: Oct. 31, 2023

(54) AUTOMATED DEEP LEARNING BASED ON CUSTOMER DRIVEN NOISE DIAGNOSTIC ASSIST

(71) Applicant: GM GLOBAL TECHNOLOGY OPERATIONS LLC, Detroit, MI (US)

(72) Inventors: Gaurav Talwar, Novi, MI (US); Kenneth Ray Booker, Grosse Pointe Woods, MI (US); William L. Villaire, Clarkston, MI (US); Jeffery J. Milton, Clarkston, MI (US); Mathew Anthony Clifford Keith Jones, Oshawa (CA)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 170 days.

(21) Appl. No.: 17/304,280

(22) Filed: Jun. 17, 2021

(65) Prior Publication Data
US 2022/0406106 A1   Dec. 22, 2022

(51) Int. Cl.
G07C 5/08 (2006.01)
G06F 18/24 (2023.01)
G06F 18/214 (2023.01)

(52) U.S. Cl.
CPC ......... *G07C 5/0833* (2013.01); *G06F 18/214* (2023.01); *G06F 18/24* (2023.01); *G07C 5/0808* (2013.01)

(58) Field of Classification Search
CPC ... G07C 5/0833; G07C 5/0808; G06F 18/214; G06F 18/24
See application file for complete search history.

(56) References Cited

U.S. PATENT DOCUMENTS

| | | | |
|---|---|---|---|
| 2018/0227696 A1* | 8/2018 | Laack | H04S 5/00 |
| 2020/0312063 A1* | 10/2020 | Balakrishnan | G08B 13/19697 |
| 2021/0327175 A1* | 10/2021 | Yamamura | G07C 5/008 |

FOREIGN PATENT DOCUMENTS

KR   20180102914 A  *  9/2018

\* cited by examiner

*Primary Examiner* — Joseph J Dallo
(74) *Attorney, Agent, or Firm* — Lorenz & Kopf, LLP

(57) ABSTRACT

Methods and apparatus are provided for diagnosing a vehicle. In one embodiment, a method includes: initiating, by a processor, a recording of a noise by at least one microphone based on user selection data from a user of the vehicle; receiving, by the processor, audio signal data based on the recording; generating, by the processor, vector data based on the audio signal data; processing, by the processor, the vector data with at least one trained machine, by the processor, learning model to determine a classification of the noise; predicting, by the processor, an action to be taken based on the classification; and storing, by the processor, the audio signal data, the classification, and the action in a datastore.

18 Claims, 4 Drawing Sheets

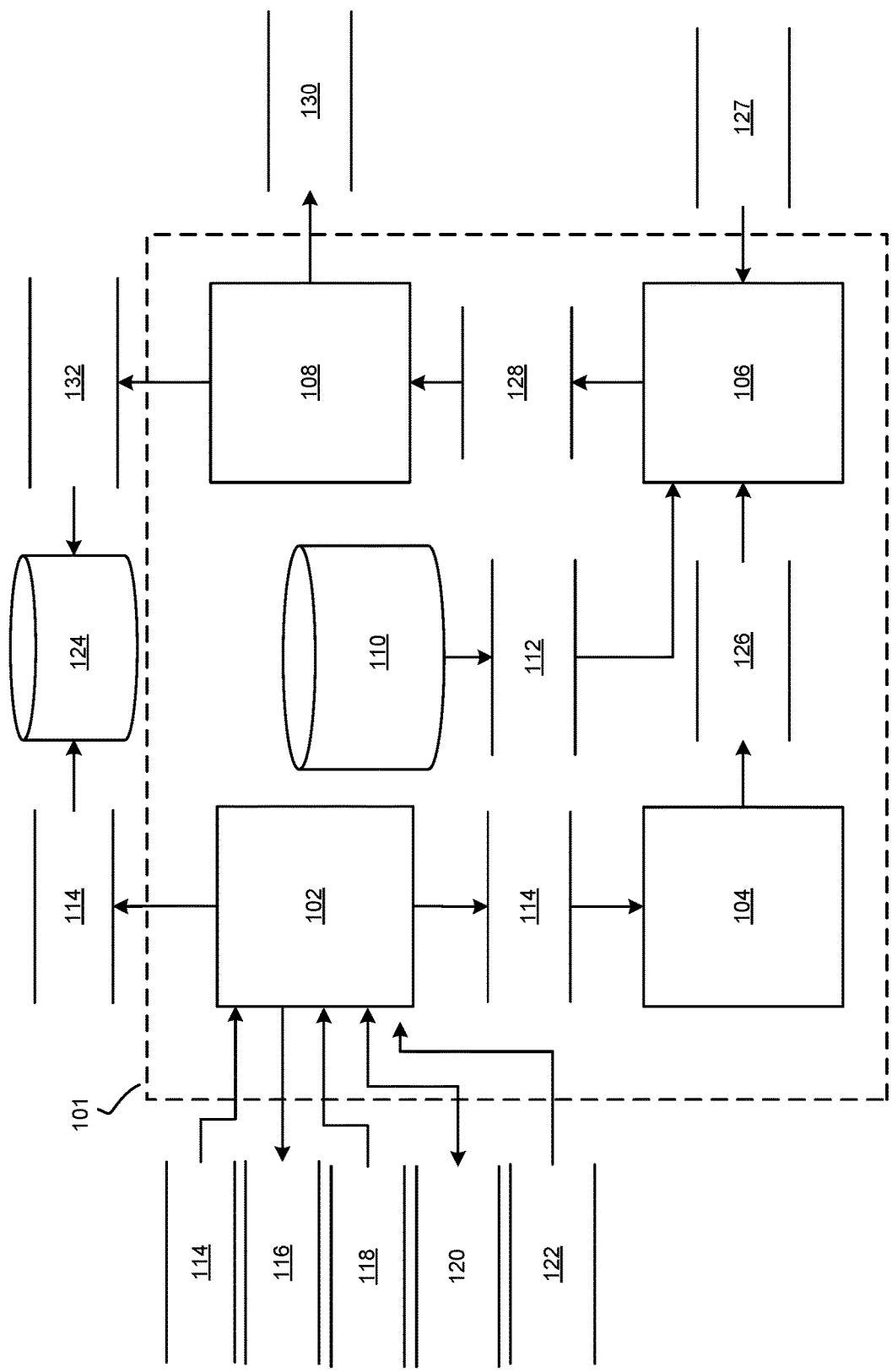

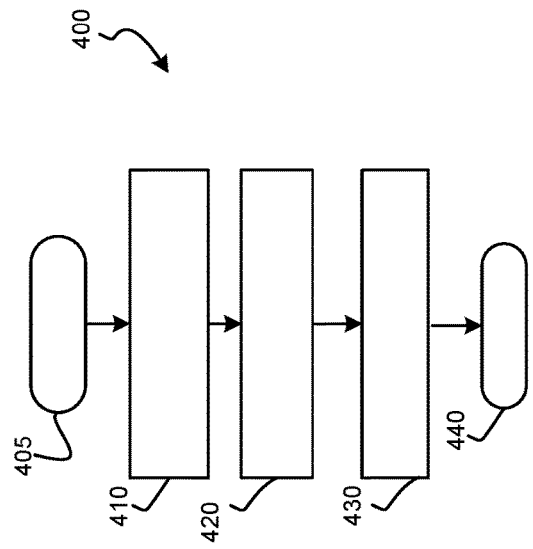
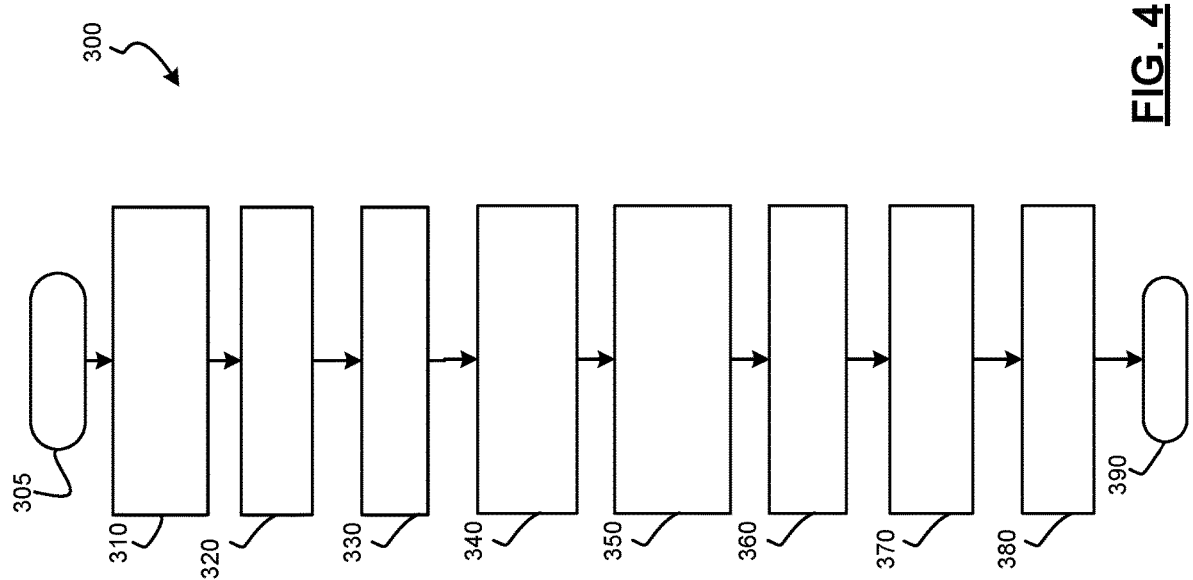

AUTOMATED DEEP LEARNING BASED ON CUSTOMER DRIVEN NOISE DIAGNOSTIC ASSIST

TECHNICAL FIELD

The technical field generally relates to systems and methods for diagnosing noise in a vehicle, more particularly to diagnosing noise in a vehicle using deep learning techniques Many noises exist when driving a vehicle. Some noises are associated with the vehicle functions while other noises are ambient noises associated with the environment. In some instances, a noise can indicate a faulty vehicle component. Accordingly, it is desirable to provide systems and methods for identifying noises of a vehicle that allows for diagnosis of a vehicle. Furthermore, other desirable features and characteristics of the present invention will become apparent from the subsequent detailed description and the appended claims, taken in conjunction with the accompanying drawings and the foregoing technical field and background.

SUMMARY

Methods and apparatus are provided for diagnosing a vehicle. In one embodiment, a method includes: initiating, by a processor, a recording of a noise by at least one microphone based on user selection data from a user of the vehicle; receiving, by the processor, audio signal data based on the recording; generating, by the processor, vector data based on the audio signal data; processing, by the processor, the vector data with at least one trained machine, by the processor, learning model to determine a classification of the noise; predicting, by the processor, an action to be taken based on the classification; and storing, by the processor, the audio signal data, the classification, and the action in a datastore.

In various embodiments, the processing the vector data includes processing the vector data with a first trained machine learning model to determine a first classification associated with a vehicle component.

In various embodiments, the method includes processing the vector data further includes processing the vector data with a second trained machine learning model to determine a second classification associated, wherein the second trained machine learning model is based on the vehicle component.

In various embodiments, the method includes generating interface data to display a user selection icon, that when, selected by the user generates the user selection data.

In various embodiments, the method includes displaying the user selection icon on a display of an infotainment system of the vehicle.

In various embodiments, the method includes displaying the user selection icon on a display of a user device associated with the vehicle.

In various embodiments, the method includes collecting vehicle data associated with the classification and associating the vehicle data with the classification as metadata.

In various embodiments, the microphone is disposed on the vehicle.

In various embodiments, the microphone is disposed on a user device associated with the vehicle.

In various embodiments, the method includes generating notification data to be displayed based on at least one of the classification and the action.

In another embodiment, a system includes: at least one microphone associated with the vehicle; and a control module configured to, by a processor, initiate a recording of a noise by the at least one microphone based on user selection data from a user of the vehicle; receive audio signal data based on the recording; generate vector data based on the audio signal data; process the vector data with at least one trained machine, by the processor, learning model to determine a classification of the noise; predict an action to be taken based on the classification; and store the audio signal data, the classification, and the action in a datastore.

In various embodiments, the control module processes the vector data by processing the vector data with a first trained machine learning model to determine a first classification associated with a vehicle component.

In various embodiments, the control module processes the vector data by processing the vector data with a second trained machine learning model to determine a second classification associated, wherein the second trained machine learning model is based on the vehicle component.

In various embodiments, the control module generates interface data to display a user selection icon, that when selected by the user, generates the user selection data.

In various embodiments, the user selection icon is displayed on a display of an infotainment system of the vehicle.

In various embodiments, the user selection icon is displayed on a display of a user device associated with the vehicle.

In various embodiments, the control module collects vehicle data associated with the classification and associates the vehicle data with the classification as metadata.

In various embodiments, the microphone is disposed on the vehicle.

In various embodiments, the microphone is disposed on a user device associated with the vehicle.

In various embodiments, the control module generates notification data to be displayed based on at least one of the classification and the action.

DESCRIPTION OF THE DRAWINGS

The exemplary embodiments will hereinafter be described in conjunction with the following drawing figures, wherein like numerals denote like elements, and wherein:

FIG. 3 is a dataflow diagram illustrating a diagnostic module, in accordance with various embodiments; and FIGS. 4 and 5 are flowcharts illustrating exemplary diagnostic methods, in accordance with various embodiments.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
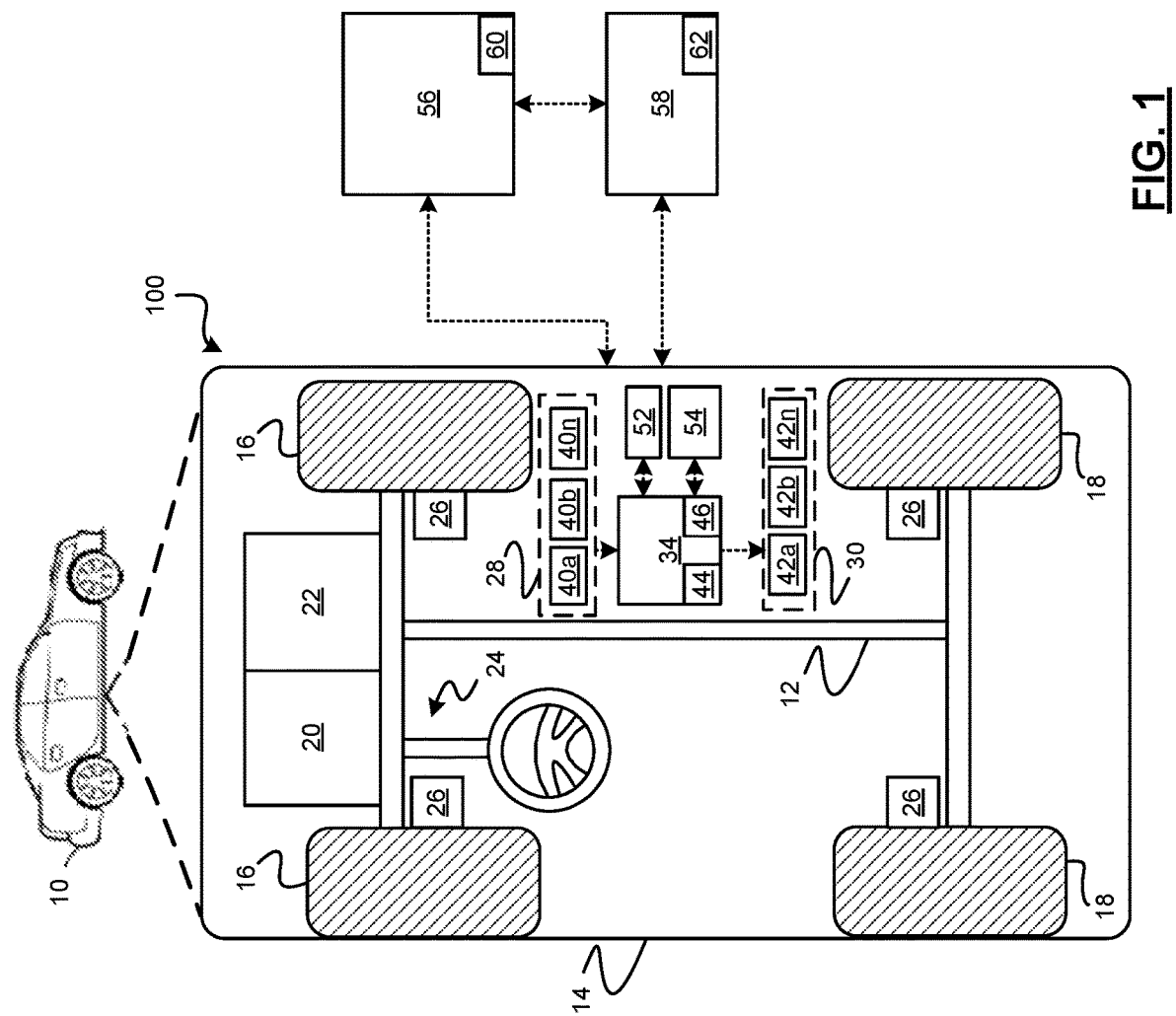
FIG. 1 is a schematic diagram of a vehicle including diagnostic system in accordance with various embodiments.

With reference to FIG. 1, a diagnostic system shown generally at 100 is associated with a vehicle 10 in accordance with various embodiments. As will be discussed in more detail below, the diagnostic system 100 records and processes noise for use in diagnosing a problem via a customer action through an app or button of an infotainment system, or a telematics system. As will be discussed in more detail below, the recordings are made by way of microphones of the vehicle and/or microphones of a smartphone or other personal device. As will further be discussed in more detail below, the processing of the microphone recordings is by way of deep learning techniques.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. In certain embodiments, the vehicle 10 comprises an automobile, such as a sedan, truck, bus, or any number of different types of automobiles. It should be appreciated, however, that the diagnostic system 100 and/or methods described herein may be implemented in other types of vehicles, including, but not limited to, aircraft and watercraft. Also in various embodiments, the terms "noise" and "sound" may be used synonymously, unless otherwise noted herein.

As shown, the vehicle 10 generally includes a propulsion system 20, a transmission system 22, a steering system 24, a brake system 26, a sensor system 28, an actuator system 30, at least one controller 34, and a communication module 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, inertial measurement units, and/or other sensors.

Figure 2:
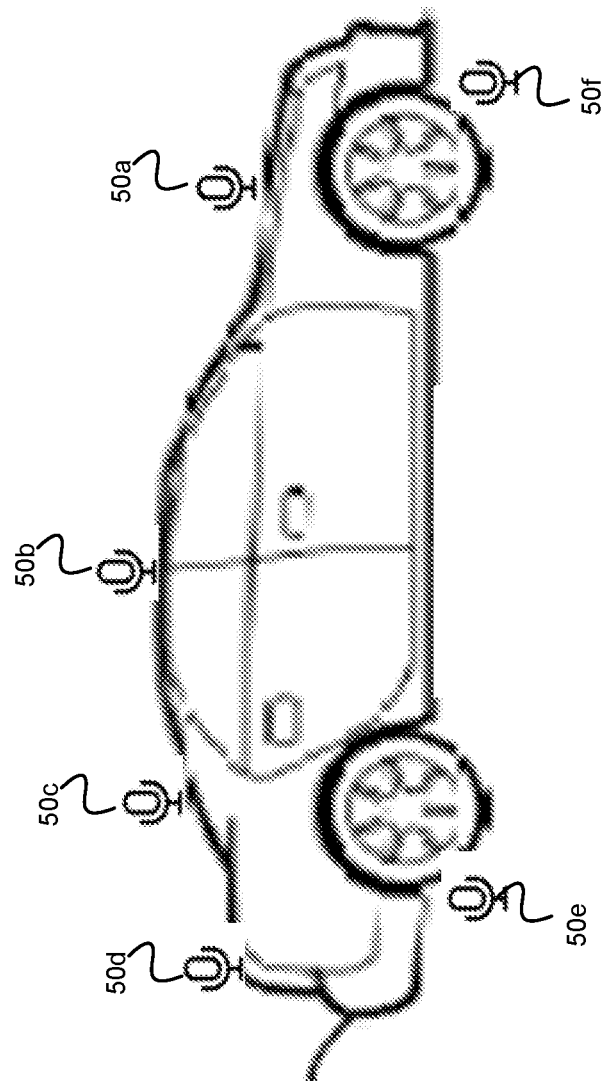
FIG. 2 is a schematic diagram of a vehicle including microphones in accordance with various embodiments.

In various embodiments, the sensing devices 40a-40n include one or more microphones. FIG. 2 illustrates exemplary microphones 50a-50f and exemplary placement relative to the vehicle 10, in accordance with various embodiments. The microphones 50a-50f generate signals corresponding to sensed sounds associated with the vehicle 10, as is appreciated by those skilled in the art. The microphones may be single element analog microphones and/or digital microphone arrays. Depending upon placement relative to the vehicle 10, the microphones 50a-50f are configured to, upon request, sense sounds within a cabin of the vehicle 10, sounds associate with components of the vehicle 10, and/or sounds associated with an environment of the vehicle 10.

With reference back to FIG. 1, the actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate by communication messages over any suitable communication medium or a combination of communication mediums and that cooperate to process the sensor signals, perform logic, calculations, methods, and/or algorithms, and generate control signals to control features of the vehicle 10.

In various embodiments, the vehicle 10 further includes an infotainment system 52, and/or a telematics system 54. The infotainment system 52 includes, for example, at least a memory and a processor and is configured to provide information (e.g., navigation, time, heading, ambient temperature, etc.) and/or entertainment (e.g., music, news, podcasts, videos, etc.) to occupants of the vehicle 10. The telematics system 54 includes, for example, at least a memory and a processor and is configured to provide communications between the vehicle 10 and remote entities, such as, but not limited to, a remote transportation system 56 (i.e., OnStar or other entity), and a user device 58 a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. The telematics system 54 is configured to wirelessly communicate information, using Wi-Fi, Bluetooth, or other protocol known in the art.

The remote transportation system 56 includes at least a database 60 for storing data associated with the recordings from the vehicle 10. The user device 58 includes at least a microphone 62 capable of capturing sounds associated with the vehicle 10.

In various embodiments, the diagnostic system 100 captures and processes audio signals from the microphones 50a-50f, 62. All or parts of the diagnostic system 100 can reside on the infotainment system 52, the telematics system 54, the user device 58, and/or the remote transportation system 56. For example, the diagnostic system 100 can be implemented as part of a feature of the infotainment system 52, a feature of the telematics system 54, and/or an app or web page of the user device 58, etc.

The diagnostic system 100 is configured to request recordings by the microphones 50a-50f, 62 automatically, upon predetermined events (e.g., a request initiated by a user), at scheduled intervals, etc. through the telematics system 54, the infotainment system 52, and/or the user device 58. The diagnostic system 100 processes the audio signals with one or more deep learning algorithms to predict one or more classifications of the recorded sound. The processing can be performed on the infotainment system 52, the telematics system 54, and/or or the user device 58. The diagnostic system 100 then stores the recordings with their associated classifications in the database of the remote transportation system 56 and/or of a datastore of the vehicle 10 for further analysis, classification, and enrichment of the database/datastore.

Referring now to FIG. 3, and with continued reference to FIG. 1, a dataflow diagram illustrates various embodiments of a diagnostic module 101 that is a part of the diagnostic system 100 as a part of the telematics system 54, the infotainment system 52 and/or the user device 58. Various embodiments of the diagnostic module 101 according to the present disclosure may include any number of sub-modules. As can be appreciated, the sub-modules shown in FIG. 3 may be combined and/or further partitioned to similarly record and process vehicle related sounds for diagnostics purposes. Inputs to the diagnostic module 101 may be received from the sensing devices 40a-40n, the microphones 50a-50n, 62, the I/O devices of the infotainment system 52, the telematics system 54 and/or the user device 58, received from other control modules (not shown) of the vehicle 10, and/or determined by other sub-modules (not shown) of the control module 34. In various embodiments, the diagnostic module 101 includes an audio signal capture module 102, a vector quantization module 104, a classification module 106, an action prediction module 108, and a model datastore 110.

In various embodiments, the model datastore 110 stores one or more trained machine learning models 112 for processing audio signals in order to predict one or more classifications of the sound. As can be appreciated, the models 112 can be trained in a supervised or supervised fashion. In various embodiments, a variety of machine learning techniques may be employed, including, for example, multivariate regression, artificial neural networks (ANNs), random forest classifiers, Bayes classifiers (e.g., naive Bayes), principal component analysis (PCA), support vector machines, linear discriminant analysis, clustering algorithms (e.g., KNN), and/or the like. In some embodiments, multiple machine learning models 112 are used (e.g., via ensemble learning techniques). As can be appreciated, embodiments of the present disclosure are not limited to any one machine learning technique.

In various embodiments, the audio signal capture module 102 captures audio signals recorded by one or more of the microphones 50a-50f, 62. For example, the audio signal capture module 102 generates interface data 116 for displaying one or more record selection icons through an interface displayed by the infotainment system 52 and/or the user device 58. In response to a selection by a user of the record selection icons, the audio signal capture module 102 receives user selection data 118 generated by the infotainment system 52, the telematics system 54, and/or the user device 58 and initiates recording of one or more selected microphones 50a-50f, 62 of the vehicle 10 or the user device 58 via one or more microphone control signals 120. In response, the audio signal capture module 102 receives the audio signals 114 recorded by the initiated microphones 50a-50f, 62.

In another example, the audio signal capture module 102 receives user command data 122 (e.g., indicating a spoken request by a user to initiate recording) generated by a microphone 50a-50f of vehicle 10 and initiates recording of one or more selected microphones 50a-50f, 62 of the vehicle 10 or the user device 58 via the microphone control signals 120. In response, the audios signal capture module 102 receives audio signals 114 recorded by the initiated microphones 50a-50f, 62

In another example, the audio signal capture module 102 automates initiation of the recording of one or more selected 50a-50f of vehicle 10 via the microphone control signals 120. In various embodiments, the automation can be based on a scheduled interval, or an occurrence of a predetermined event.

In various embodiments, the audio signal capture module 102 stores the audio signals in a datastore 124 for further processing. The datastore 124 can reside on the vehicle 10 and/or the database 60 of the remote transportation system 56. In various embodiments, the audio signal capture module 102 provides the captured audio signals 114 to other modules for further processing.

The vector quantization module 104 receives the captured audio signals 114. The vector quantization module 104 processes the audio signal 114 with a machine learning model such as a neural network to quantify the audio signal 114 into vector data 126. The machine learning model selects a vector from a finite set of possible vectors to represent the audio signals 114. In various embodiments, other quantization methods can be used including, but not limited to, tree-structured vector quantization, direct sum vector quantization, Cartesian product vector quantization, lattice vector quantization, classified vector quantization, feedback vector quantization, and fuzzy vector quantization.

The classification module 106 receives the vector data 126. The classification module 106 retrieves one or more trained machine learning models 112 from the model datastore 110 and processes the vector data 126 with the machine learning models to predict a classification of the sound. The classification module 106 generates classification data 128 based thereon.

In various embodiments, the classification module 106 processes the vector data 126 with a first trained machine learning model to predict a primary classification associated with, for example, a vehicle component (e.g., engine noise, transmission noise, brake noise, road noise, tire noise, wind noise, rattle noise, etc.). In various embodiments, the classification module 106 then, based on the primary classification, retrieves a second trained machine learning model 112 from the model datastore 110 and processes the vector data 126 with the second trained machine learning model 112 to predict a secondary classification associated with the primary classification (e.g., when the primary classification, the secondary classification can be engine knocking noise, diesel atomizer, noise, fuel pump noise, etc.) The classification module 106 generates the classification data 128 based on the primary classification and the secondary classification.

The action prediction module 108 receives as input the classification data 128. The action prediction module 108 generates notification data 130 indicating an action to be taken based on the noise classification. For example, the action can indicate to service the engine fuel system, service an exhaust system component, or no service necessary as the noise does not indicate a fault. The actions to be taken can be predefined according to standard repair techniques in the industry. The notification data 130 can be displayed by an interface for viewing by a user. The notification data 130 can be sent to a technician for review and confirmation. The notification data 130 can be stored in the datastore 124 along with the classification data 128 for further diagnostic purposes.

Referring now to FIGS. 4-5, and with continued reference to FIGS. 1-3, flowcharts illustrate methods 300. 400 that can be performed by the system 100 of FIGS. 1-3 in accordance with the present disclosure. As can be appreciated in light of the disclosure, the order of operation within the methods 300, 400 is not limited to the sequential execution as illustrated in FIGS. 4-5 but may be performed in one or more varying orders as applicable and in accordance with the present disclosure. In various embodiments, the methods 300, 400 can be scheduled to run based on one or more predetermined events, and/or can run continuously during operation of the vehicle 10.

As depicted in FIG. 4, the method 300 may begin at 305. User selection data 118 is received to initiate recording of a noise at 310. The audio signal data 114 is received, including the recorded noise, at 320. The signal information is quantified into one or more vectors at 330. The one or more vectors are processed with the trained machine learning model to predict a first general classification of the noise at 340. Thereafter, the one or more vectors are processed with a second trained machine learning model to predict a secondary classification associated with the first classification at 350.

Thereafter, vehicle data 127 is collected, for example, from the vehicle sensing devices 40a-40n at 360. The vehicle data 127 is associated with the classification as metadata and evaluated to predict an event and generate notification data 130 based thereon at 370. The event prediction, classifications, and metadata are stored in the datastore for 24 for further evaluation by a user or technician at 380. Thereafter, the method may end at 390

As depicted in FIG. 5, the method may begin at 405. Labeled sound data is compiled at 410. The labeled sound data is processed with the machine learning model to train the machine learning model at 420. The trained machine learning model is saved in the machine learning model datastore for further processing at 430. Thereafter, the method may end at 440.

It will be appreciated that the disclosed methods, systems, and vehicles may vary from those depicted in the Figures and described herein. For example, the diagnostic system 100, the vehicle 10, and/or various components thereof may vary from that depicted in FIGS. 1-3 and described in connection therewith. It will similarly be appreciated that the steps of the methods may differ from and/or be performed in a different order than, and/or may otherwise differ from, and/or be implemented differently than, the illustrations in FIGS. 4-5 and/or the discussions above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of diagnosing a vehicle, the method comprising:
  initiating, by a processor, a recording of a noise by at least one microphone based on user selection data from a user of the vehicle;
  receiving, by the processor, audio signal data based on the recording;
  generating, by the processor, vector data based on the audio signal data using vector quantization;
  processing, by the processor, the vector data with at least one trained machine, by the processor, learning model to determine a classification of a vehicle component associated with the noise;
  predicting, by the processor, an action to be taken based on the classification; and
  storing, by the processor, the audio signal data, the classification, and the action in a datastore.

2. The method of claim 1, wherein the processing the vector data further comprises processing the vector data with a second trained machine learning model to determine a second classification of a sub-component associated with the vehicle component.

3. The method of claim 1, further comprising generating interface data to display a user selection icon, that when, selected by the user generates the user selection data.

4. The method of claim 3, further comprising displaying the user selection icon on a display of an infotainment system of the vehicle.

5. The method of claim 3, further comprising displaying the user selection icon on a display of a user device associated with the vehicle.

6. The method of claim 1, further comprising collecting vehicle data associated with the classification and associating the vehicle data with the classification as metadata.

7. The method of claim 1, wherein the at least one microphone is disposed on the vehicle.

8. The method of claim 1, wherein the at least one microphone is disposed on a user device associated with the vehicle.

9. The method of claim 1, further comprising generating notification data to be displayed based on at least one of the classification and the action.

10. A system for diagnosing a vehicle, comprising:
at least one microphone associated with the vehicle; and
a control module configured to, by a processor,
initiate a recording of a noise by the at least one microphone based on user selection data from a user of the vehicle;
receive audio signal data based on the recording;
generate vector data based on the audio signal data using vector quantization;
process the vector data with at least one trained machine, by the processor, learning model to determine a classification of a vehicle component associated with the noise;
predict an action to be taken based on the classification; and
store the audio signal data, the classification, and the action in a datastore.

11. The system of claim 10, wherein the control module processes the vector data by processing the vector data with a second trained machine learning model to determine a second classification of a sub-component associated with the vehicle component.

12. The system of claim 10, wherein the control module generates interface data to display a user selection icon, that when selected by the user, generates the user selection data.

13. The system of claim 12, wherein the user selection icon is displayed on a display of an infotainment system of the vehicle.

14. The system of claim 12, wherein the user selection icon is displayed on a display of a user device associated with the vehicle.

15. The system of claim 10, wherein the control module collects vehicle data associated with the classification and associates the vehicle data with the classification as metadata.

16. The system of claim 10, wherein the at least one microphone is disposed on the vehicle.

17. The system of claim 10, wherein the at least one microphone is disposed on a user device associated with the vehicle.

18. The system of claim 10, wherein the control module generates notification data to be displayed based on at least one of the classification and the action.

* * * * *